US009766460B2

(12) United States Patent
Burns et al.

(10) Patent No.: US 9,766,460 B2
(45) Date of Patent: Sep. 19, 2017

(54) GROUND PLANE ADJUSTMENT IN A VIRTUAL REALITY ENVIRONMENT

(71) Applicant: Microsoft Technology Licensing, LLC, Redmond, WA (US)

(72) Inventors: Aaron Burns, Newcastle, WA (US); Ben Sugden, Redmond, WA (US); Laura Massey, Redmond, WA (US); Alexandre Da Veiga, Bellevue, WA (US); Tom Salter, Seattle, WA (US); Greg Alt, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 229 days.

(21) Appl. No.: 14/611,447

(22) Filed: Feb. 2, 2015

(65) Prior Publication Data
US 2016/0027213 A1    Jan. 28, 2016

Related U.S. Application Data

(60) Provisional application No. 62/029,351, filed on Jul. 25, 2014.

(51) Int. Cl.
*G02B 27/01*    (2006.01)
*G06F 3/01*    (2006.01)
(Continued)

(52) U.S. Cl.
CPC ....... *G02B 27/0172* (2013.01); *G02B 27/017* (2013.01); *G06F 3/012* (2013.01);
(Continued)

(58) Field of Classification Search
CPC ... G06T 19/006; G06T 7/0042; G06T 19/003; G06T 2215/01; G06F 3/011; G06F 3/04815; G06F 3/012
See application file for complete search history.

(56) References Cited

U.S. PATENT DOCUMENTS 5,819,206 A    10/1998 Horton et al.
5,877,748 A    3/1999 Redlich
(Continued)

FOREIGN PATENT DOCUMENTS

CN    101540020 B    9/2012
CN    103761085 A    4/2014
(Continued)

OTHER PUBLICATIONS

"International Search Report and Written Opinion Issued in PCT Application No. PCT/US2015/041865", Mailed Date: Jan. 25, 2016, 12 Pages.
(Continued)

*Primary Examiner* — Jeffrey Chow
(74) *Attorney, Agent, or Firm* — Mark K. Young; Mayer & Williams PC

(57) ABSTRACT

An HMD device is configured to vertically adjust the ground plane of a rendered virtual reality environment that has varying elevations to match the flat real world floor so that the device user can move around to navigate and explore the environment and always be properly located on the virtual ground and not be above it or underneath it. Rather than continuously adjust the virtual reality ground plane, which can introduce cognitive dissonance discomfort to the user, when the user is not engaged in some form of locomotion (e.g., walking), the HMD device establishes a threshold radius around the user within which virtual ground plane adjustment is not performed. The user can make movements within the threshold radius without the HMD device shifting the virtual terrain. When the user moves past the threshold radius, the device will perform an adjustment as needed to match the ground plane of the virtual reality environment to the real world floor.

20 Claims, 18 Drawing Sheets

(51) Int. Cl.
*H04N 13/02* (2006.01)
*G06T 7/73* (2017.01)
*H04N 13/00* (2006.01)

(52) U.S. Cl.
CPC ............ *G06T 7/73* (2017.01); *H04N 13/0278* (2013.01); *G02B 2027/0138* (2013.01); *G02B 2027/0178* (2013.01); *G06T 2207/10016* (2013.01); *G06T 2207/10028* (2013.01); *H04N 13/0203* (2013.01); *H04N 2013/0081* (2013.01)

(56) References Cited

U.S. PATENT DOCUMENTS

| | | | |
|---|---|---|---|
| 6,012,926 | A | 1/2000 | Hodges et al. |
| 6,023,275 | A | 2/2000 | Horvitz et al. |
| 6,329,986 | B1 | 12/2001 | Cheng |
| 6,396,495 | B1 | 5/2002 | Parghi et al. |
| 6,396,497 | B1 | 5/2002 | Reichlen |
| 6,529,331 | B2 | 3/2003 | Massof et al. |
| 6,552,698 | B1 * | 4/2003 | Walker ................ G02B 27/017 345/7 |
| 6,741,241 | B1 | 5/2004 | Jaubert et al. |
| 6,898,266 | B2 | 5/2005 | Griffith |
| 7,274,380 | B2 | 9/2007 | Navab et al. |
| 7,386,799 | B1 | 6/2008 | Clanton et al. |
| 7,400,322 | B1 | 7/2008 | Urbach |
| 7,486,817 | B2 | 2/2009 | Yanagawa et al. |
| 7,538,775 | B2 | 5/2009 | Ishihara |
| 7,542,210 | B2 | 6/2009 | Chirieleison, Sr. |
| 7,557,774 | B2 | 7/2009 | Baudisch et al. |
| 8,049,750 | B2 | 11/2011 | Gloudemans et al. |
| 8,266,536 | B2 | 9/2012 | Roberts et al. |
| 8,405,680 | B1 | 3/2013 | Cardoso Lopes |
| 8,576,247 | B2 | 11/2013 | Avkarogullari et al. |
| 8,611,015 | B2 | 12/2013 | Wheeler et al. |
| 8,751,969 | B2 | 6/2014 | Matsuda et al. |
| 8,754,931 | B2 | 6/2014 | Gassel et al. |
| 8,780,014 | B2 | 7/2014 | Border et al. |
| 8,793,620 | B2 | 7/2014 | Stafford |
| 9,443,352 | B1 * | 9/2016 | Glover ................ G06T 19/003 |
| 2001/0035845 | A1 | 11/2001 | Zwern |
| 2002/0044152 | A1 | 4/2002 | Abbott et al. |
| 2002/0154214 | A1 | 10/2002 | Scallie et al. |
| 2002/0181115 | A1 | 12/2002 | Massof et al. |
| 2003/0091226 | A1 | 5/2003 | Cahill |
| 2005/0024388 | A1 | 2/2005 | Takemoto |
| 2005/0143887 | A1 | 6/2005 | Kinoshita |
| 2006/0050070 | A1 * | 3/2006 | Matsui ................ G06T 19/006 345/419 |
| 2006/0092178 | A1 | 5/2006 | Tanguay, Jr. |
| 2006/0095207 | A1 | 5/2006 | Reid |
| 2006/0241827 | A1 | 10/2006 | Fukuchi |
| 2007/0057946 | A1 | 3/2007 | Albeck |
| 2007/0132662 | A1 | 6/2007 | Morita |
| 2008/0174659 | A1 | 7/2008 | McDowall |
| 2008/0195315 | A1 * | 8/2008 | Hu ................ G01C 21/3647 701/455 |
| 2008/0284864 | A1 | 11/2008 | Kotake |
| 2009/0160985 | A1 | 6/2009 | Javidi |
| 2009/0167785 | A1 | 7/2009 | Wong |
| 2009/0325699 | A1 | 12/2009 | Delgiannidis |
| 2010/0208035 | A1 | 8/2010 | Pinault |
| 2010/0208057 | A1 * | 8/2010 | Meier ................ G06T 7/0046 348/135 |
| 2010/0226017 | A1 | 9/2010 | Spaller |
| 2010/0315413 | A1 | 12/2010 | Izadi et al. |
| 2011/0029903 | A1 | 2/2011 | Schooleman et al. |
| 2011/0043627 | A1 | 2/2011 | Werling et al. |
| 2011/0140994 | A1 * | 6/2011 | Noma ................ G02B 27/017 345/8 |
| 2012/0052917 | A1 | 3/2012 | Kim |
| 2012/0056876 | A1 | 3/2012 | Lee et al. |
| 2012/0068913 | A1 | 3/2012 | Bar-Zeev et al. |
| 2012/0092328 | A1 | 4/2012 | Flaks |
| 2012/0113092 | A1 | 5/2012 | Bar-Zeev et al. |
| 2012/0195471 | A1 | 8/2012 | Newcombe |
| 2012/0237116 | A1 * | 9/2012 | Xiao ................ G06K 9/6257 382/159 |
| 2012/0249741 | A1 | 10/2012 | Maciocci |
| 2012/0309522 | A1 | 12/2012 | Westlund et al. |
| 2012/0313839 | A1 | 12/2012 | Smithwick |
| 2012/0327116 | A1 | 12/2012 | Liu et al. |
| 2013/0044128 | A1 | 2/2013 | Liu et al. |
| 2013/0050258 | A1 | 2/2013 | Liu et al. |
| 2013/0050432 | A1 | 2/2013 | Perez et al. |
| 2013/0083007 | A1 | 4/2013 | Geisner et al. |
| 2013/0083018 | A1 | 4/2013 | Geisner |
| 2013/0088413 | A1 | 4/2013 | Raffle et al. |
| 2013/0093789 | A1 | 4/2013 | Liu et al. |
| 2013/0127860 | A1 | 5/2013 | Hadap |
| 2013/0127980 | A1 | 5/2013 | Haddick |
| 2013/0137076 | A1 | 5/2013 | Perez et al. |
| 2013/0141419 | A1 | 6/2013 | Mount et al. |
| 2013/0147686 | A1 | 6/2013 | Clavin et al. |
| 2013/0194259 | A1 | 8/2013 | Bennett et al. |
| 2013/0222647 | A1 | 8/2013 | Ishihara |
| 2013/0257751 | A1 | 10/2013 | Stafford |
| 2013/0287290 | A1 | 10/2013 | Owechko |
| 2013/0300637 | A1 | 11/2013 | Smits et al. |
| 2013/0307855 | A1 | 11/2013 | Lamb et al. |
| 2013/0326364 | A1 | 12/2013 | Latta et al. |
| 2013/0328927 | A1 | 12/2013 | Mount et al. |
| 2013/0335301 | A1 | 12/2013 | Wong |
| 2013/0335303 | A1 | 12/2013 | Maciocci et al. |
| 2013/0336629 | A1 | 12/2013 | Mulholland et al. |
| 2013/0342564 | A1 | 12/2013 | Kinnebrew et al. |
| 2013/0342570 | A1 | 12/2013 | Kinnebrew et al. |
| 2014/0002444 | A1 | 1/2014 | Bennett et al. |
| 2014/0049559 | A1 | 2/2014 | Fleck et al. |
| 2014/0098009 | A1 | 4/2014 | Prest |
| 2014/0104142 | A1 | 4/2014 | Bickerstaff et al. |
| 2014/0132484 | A1 | 5/2014 | Pandey et al. |
| 2014/0132715 | A1 | 5/2014 | Raghoebardayal |
| 2014/0139639 | A1 | 5/2014 | Wagner |
| 2014/0140579 | A1 | 5/2014 | Takemoto |
| 2014/0168264 | A1 | 6/2014 | Harrison |
| 2014/0176530 | A1 | 6/2014 | Pathre |
| 2014/0184550 | A1 | 7/2014 | Hennessey et al. |
| 2014/0204117 | A1 | 7/2014 | Kinnebrew et al. |
| 2014/0221090 | A1 | 8/2014 | Mutschler et al. |
| 2014/0240351 | A1 | 8/2014 | Scavezze et al. |
| 2014/0253605 | A1 | 9/2014 | Border et al. |
| 2014/0267400 | A1 * | 9/2014 | Mabbutt ............... G06T 19/006 345/633 |
| 2014/0363073 | A1 * | 12/2014 | Shirakyan ............ G06T 7/0075 382/154 |
| 2014/0372957 | A1 | 12/2014 | Keane et al. |
| 2015/0143459 | A1 | 5/2015 | Molnar |
| 2015/0178956 | A1 | 6/2015 | Davis |
| 2015/0205106 | A1 | 7/2015 | Norden |
| 2015/0243078 | A1 | 8/2015 | Watson |
| 2015/0261293 | A1 | 9/2015 | Wilairat |
| 2015/0356788 | A1 | 12/2015 | Abe et al. |

FOREIGN PATENT DOCUMENTS

| | | |
|---|---|---|
| EP | 1521482 A2 | 4/2005 |
| EP | 2164045 A2 | 3/2010 |
| WO | 2009128781 A1 | 10/2009 |
| WO | 2013029097 A2 | 3/2013 |
| WO | 2013052855 A2 | 4/2013 |
| WO | 2013057649 A1 | 4/2013 |
| WO | 2013085193 A1 | 6/2013 |
| WO | 2013155217 A1 | 10/2013 |

(56) References Cited

FOREIGN PATENT DOCUMENTS

| WO | 2014188798 A1 | 11/2014 |
|---|---|---|
| WO | 2015108887 A1 | 7/2015 |

OTHER PUBLICATIONS

"International Search Report & Written Opinion Issued in PCT Patent Application No. PCT/US2015/041866", Mailed Date: Nov. 27, 2015, 12 Pages.
"International Search Report and Written Opinion Issued in PCT Patent Application No. PCT/US2015/041861", Mailed Date: Oct. 30, 2015, (11 pages total).
"International Search Report and Written Opinion Issued in PCT Application No. PCT/US2015/041867", Mailed Date: Nov. 25, 2015, (11 Pages total).
"International Search Report & Written Opinion Received for PCT Application No. PCT/US2015/041863",Mailed Date: Nov. 16, 2015, (12 Pages total).
"International Search Report & Written Opinion Issued in PCT Application No. PCT/US2015/041862", Mailed Date: Nov. 16, 2015, (11 Pages total).
"Gaze Awareness for Videoconferencing: A Software Approach" (by Jim Gemmell and Kentaro Toyama, Microsoft; C. Lawrence Zitnick and Thomas Kang, Carnegie Mellon University; Steven Seitz, University of Washington, in 1070-986X/00/$10.00 © IEEE) (10 pages total).
"Second Written Opinion Issued in PCT Application No. PCT/US2015/041866", Mailed Date: Jun. 27, 2016, 7 Pages.
"Second Written Opinion Issued in PCT Application No. PCT/US2015/041865", Mailed Date: Jun. 15, 2016, 8 Pages.
"Second Written Opinion Issued in PCT Application No. PCT/US2015/041868", Mailed Date: Jul. 1, 2016, (6 Pages).
"Second Written Opinion Issued in PCT Application No. PCT/US2015/041862", Mailed Date: Jun. 13, 2016, 5 Pages.
"Second Written Opinion Issued in PCT Application No. PCT/US2015/041863", Mailed Date: Jun. 15, 2016, 7 Pages.
"Second Written Opinion Issued in PCT Application No. PCT/US2015/041861", Mailed Date: Jun. 20, 2016, 6 Pages.
Duchowski, Andrew, "Chapter 7—Head-Mounted System Software Development", In Book Eye Tracking Methodology, Theory and Practice, Part 2, Jan. 1, 2007, pp. 69-86. (18 pages total).
"International Preliminary Report on Patentability Issued in PCT Application No. PCT/US2015/041868", Mailed Date: Oct. 28, 2015, (10 Pages total).
"International Preliminary Report on Patentability Issued in PCT Application No. PCT/US2015/041864", Mailed Date: Oct. 26, 2015, (11 Pages total).
Nilsen, et al., "Tankwar—Tabletop War Gaming in Augmented Reality", In 2nd International Workshop on Pervasive Gaming Applications, PerGames. vol. 5, Retrieved on: Sep. 12, 2014, 5 pages.
Murray, et al., "Comparison of Head Gaze and Head and Eye Gaze within an Immersive Environment", In Tenth IEEE International Symposium on Distributed Simulation and Real-Time Applications, Oct. 2, 2006, 7 pages.
Steptoe, et al., "Eye Tracking for Avatar Eye Gaze Control during Object-Focused Multiparty Interaction in Immersive Collaborative Virtual Environments", In IEEE Virtual Reality Conference, Mar. 14, 2009, 8 pages.
Suma, et al., "Sharing Space in Mixed and Virtual Reality Environments Using a Low-Cost Depth Sensor", In Proceedings of IEEE International Symposium on Virtual Innovation, Mar. 19, 2011, 2 pages.
Ponto, et al., "Perceptual Calibration for Immersive Display Environments", In IEEE Transactions on Visualization and Computer Graphics, vol. 19, Issue 4, Apr. 2013, pp. 691-700, 10 pages.
Li, et al., "On the Anisotropy of Perceived Ground Extents and the Interpretation of Walked Distance as a Measure of Perception", In Journal of Experimental Psychology: Human Perception and Performance, vol. 39, Issue 2, Apr. 2013, 33 pages.
Li, et al., "The Underestimation of Egocentric Distance: Evidence from Frontal Matching Tasks", In Proceedings of Attention, Perception & Psychophysics, Oct. 2011, 15 pages.
Howe, Bo, "Holographic Computer Monitor", Published on: Aug. 18, 2010, Available at: www.youtube.com/watch?v=tHlxj7fY-38, 2 pages.
Angley, Natalie, "Glasses to make you a real-life Tony Stark", Published on: Oct. 31, 2013, Available at: http://edition.cnn.com/2013/10/31/tech/innovation/meta-augmented-reality-glasses/, 4 pages.
Hiner, Jason, "Future iPhone concept: Laser keyboard and holographic display", Published on: Aug. 31, 2011, Available at: http://www.techrepublic.com/blog/tech-sanity-check/future-iphone-concept-laser-keyboard-and-holographic-display/, 6 pages.
Chen, Jian, "A Virtual Environment System for the Comparative Study of Dome and HMD", In Master Thesis, Department of Computer Science, University of Houston, May 2002, 104 pages.
McCarthy, Mike, "HP intros new versions of its mobile and tower workstations", Retrieved on: Sep. 11, 2014, Available at: http://postperspective.com/hp-intros-new-versions-pro-offerings/, 5 pages.
Nakashima, et al., "A 2D-3D Integrated Environment for Cooperative Work", In Proceedings of the Virtual Reality Software and Technology, Nov. 7, 2005, 7 pages.
Pierce, et al., "Image Plane Interaction Techniques in 3D Immersive Environments", In Proceedings of the symposium on Interactive 3D graphics, Apr. 30, 1997, 10 pages.
Regenbrecht, et al., "Interaction in a Collaborative Augmented Reality Environment", In Proceedings of CHI Extended Abstracts on Human Factors in Computing Systems, Apr. 20, 2002, 2 pages.
"Touchscreen interface for seamless data transfer between the real and virtual worlds", Published on: Apr. 15, 2013, Available at: http://www.diginfo.tv/v/13-0025-r-en.php, 8 pages.
Urban, John, "Five Free Tools for Multi-Monitor Computer Set-Ups", Published on: Sep. 16, 2009, Available at: http://sixrevisions.com/tools/five-free-tools-for-multi-monitor-computer-set-ups/, 17 pages.
Steinicke, et al., "Natural Perspective Projections for Head-Mounted Displays", In IEEE Transactions on Visualization and Computer Graphics, Jul. 2011, 12 pages.
Hogue, David, "What Are Index and Alpha Transparency?", Published on: Mar. 3, 2011, Available at: http://www.idux.com/2011/02/27/what-are-index-and-alpha-transparency/, 14 pages.
Jimenez, et al., "Gaze-based Interaction for Virtual Environments", In Journal of Universal Computer Science, vol. 14, Issue 19, Nov. 2008, 14 pages.
Kinoshita, et al., "A Fast and Robust 3D Head Pose and Gaze Estimation System", In 8th IEEE International Conference onAutomatic Face & Gesture Recognition, Sep. 17, 2008, 2 pages.
Peterson, et al., "Evaluation of Alternative Label Placement Techniques in Dynamic Virtual Environments", In Proceedings of the 10th International Symposium on Smart Graphics, May 22, 2009, 7 pages.
Kuhl, et al., "HMD Calibration and its Effects on Distance Judgments", In Proceedings of the 5th symposium on Applied perception in graphics and visualization, Aug. 9, 2008, 24 pages.
Kim. et al., "3D Reconstruction of Stereo Images for Interaction between Real and Virtual Worlds", In Proceedings of the Second IEEE and ACM International Symposium on Mixed and Augmented Reality, Oct. 7, 2003, 9 pages.
Amar, et al., "Synthesizing Reality for Realistic Physical Behavior of Virtual Objects in Augmented Reality Applications for Smart-Phones", In Proceedings of IEEE Virtual Reality, Mar. 16, 2013, pp. 123-124, 2 pages.
Lavoie, et al., "Constructing 3D Virtual Reality Objects from 2D Images of Real Objects Using NURBS", In Proceedings of IEEE International Conference on Virtual Environments, Human-Computer Interfaces, and Measurement Systems Ostuni, Jun. 25, 2007, 8 pages.

(56) References Cited

OTHER PUBLICATIONS

Nóbrega, et al., "Magnetic Augmented Reality: Virtual Objects in Your Space", In Proceedings of the International Working Conference on Advanced Visual Interfaces, May 21, 2012, pp. 332-335, 4 pages.
Izadi, et al., "KinectFusion: Real-time 3D Reconstruction and Interaction Using a Moving Depth Camera", In Proceedings of the 24th annual ACM symposium on User interface software and technology, Oct. 16, 2011, 10 pages.
Kalkofen, et al., "Visualization Techniques for Augmented Reality", In Proceedings of Handbook of Augmented Reality, Jul. 13, 2011, pp. 65-98, 34 pages.
Maimone, et al., "Computational Augmented Reality Eyeglasses", In Proceedings of IEEE International Symposium on Mixed and Augmented Reality, Oct. 1, 2013, 10 pages.
"Virtual Reality (VR) and Mixed Reality (MR) technologies", Retrieved on: Sep. 12, 2014, Available at: http://www.vr-hyperspace.eu/about-vr-hyperspace/technology/77-virtual-reality-vr-and-mixed-reality-mr-technologies (5 pages total).
"International Preliminary Report on Patentability Issued in PCT Application No. PCT/US2015/041868", Mailed Date: Oct. 13, 2016, 8 Pages.
"International Preliminary Report on Patentability Issued in PCT Application No. PCT/US2015/041863", Mailed Date: Oct. 13, 2016, 8 Pages.
"International Preliminary Report on Patentability Issued in PCT Application No. PCT/US2015/041862", Mailed Date: Oct. 13, 2016, 6 Pages.
"International Preliminary Report on Patentability Issued in PCT Application No. PCT/US2015/041861", Mailed Date: Oct. 13, 2016, 7 Pages.
"International Preliminary Report on Patentability Issued in PCT Application No. PCT/US2015/041865", Mailed Date: Oct. 19, 2016, 7 Pages.
"International Preliminary Report on Patentability Issued in PCT Application No. PCT/US2015/041866", Mailed Date: Oct. 27, 2016, 9 Pages.

\* cited by examiner

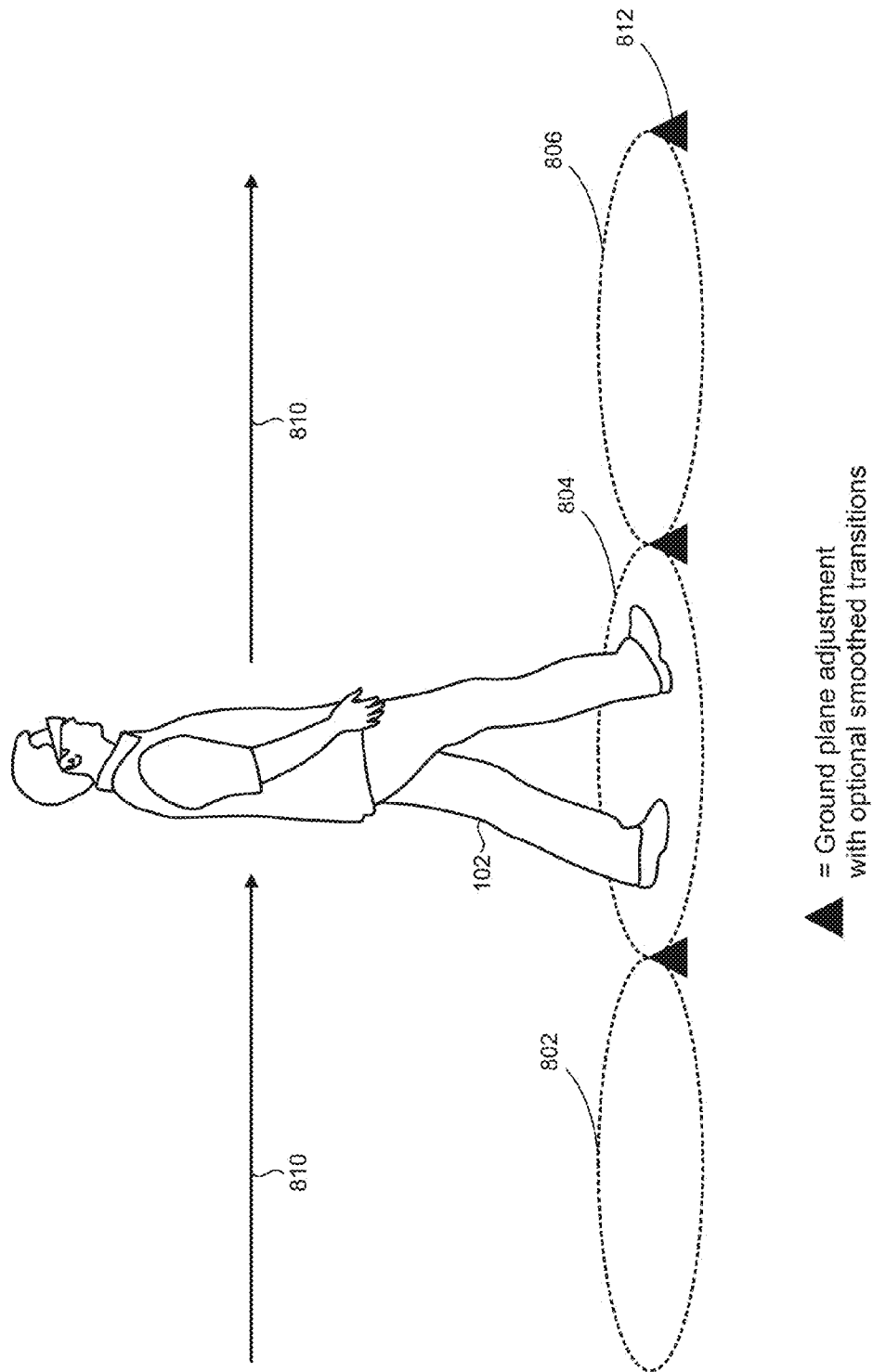

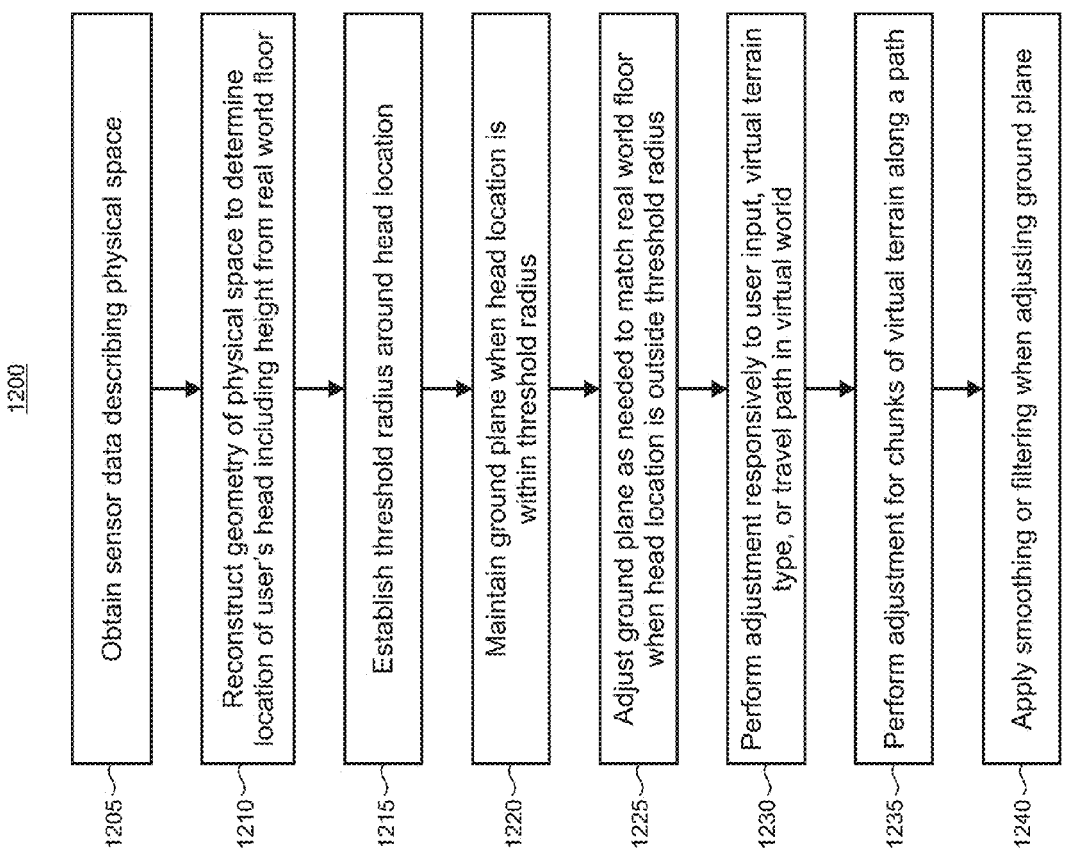

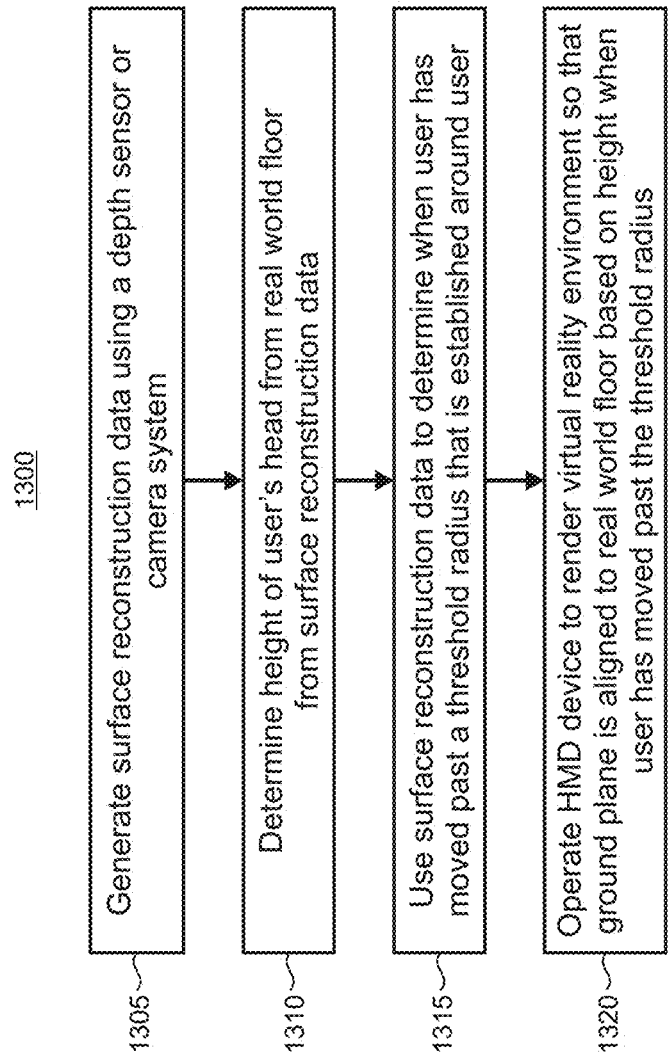

GROUND PLANE ADJUSTMENT IN A VIRTUAL REALITY ENVIRONMENT

STATEMENT OF RELATED APPLICATIONS

This application claims benefit and priority to U.S. Provisional Application Ser. No. 62/029,351 filed Jul. 25, 2014, entitled "Head Mounted Display Experiences" which is incorporated herein by reference in its entirety.

BACKGROUND

Virtual reality computing devices, such as head mounted display (HMD) systems and handheld mobile devices (e.g. smart phones, tablet computers, etc.), may be configured to display a virtual reality environment to a user in the field of view of the user and/or a field of view of a camera of the device. Similarly, a mobile device may display such information using a camera viewfinder window.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An HMD device is configured to vertically adjust the ground plane of a rendered virtual reality environment that has varying elevations (e.g., steps, curbs, ramps, undulations, hills, etc.) to match the flat real world floor so that the device user can move around to navigate and explore the environment and always be properly located on the virtual ground and not be above it or underneath it. Rather than continuously adjust the virtual reality ground plane, which can introduce cognitive dissonance discomfort to the user, when the user is not engaged in some form of locomotion (e.g., walking), the HMD device establishes a threshold radius around the user within which virtual ground plane adjustment is not performed.

The user can make movements within the threshold radius such as moving his head to look around, bending down, and changing position without the HMD device shifting the virtual terrain. When the user moves past the threshold radius, the device will perform an adjustment as needed to match the ground plane of the virtual reality environment to the real world floor. This technique enables effective and performant rendering of virtual environments having variable elevations so that, for example, users do not end up walking through virtual hills or curbs (which reduces the immersiveness of the experience) while reducing the opportunities for user discomfort.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIG. 8 shows ground plane adjustment illustratively performed in chunks with smoothed transitions between chunks as an HMD device user moves in virtual/real worlds;

FIGS. 12, 13, and 14 are flowcharts of illustrative methods that may be performed using an HMD device;

Like reference numerals indicate like elements in the drawings. Elements are not drawn to scale unless otherwise indicated.

DETAILED DESCRIPTION

Figure 1:
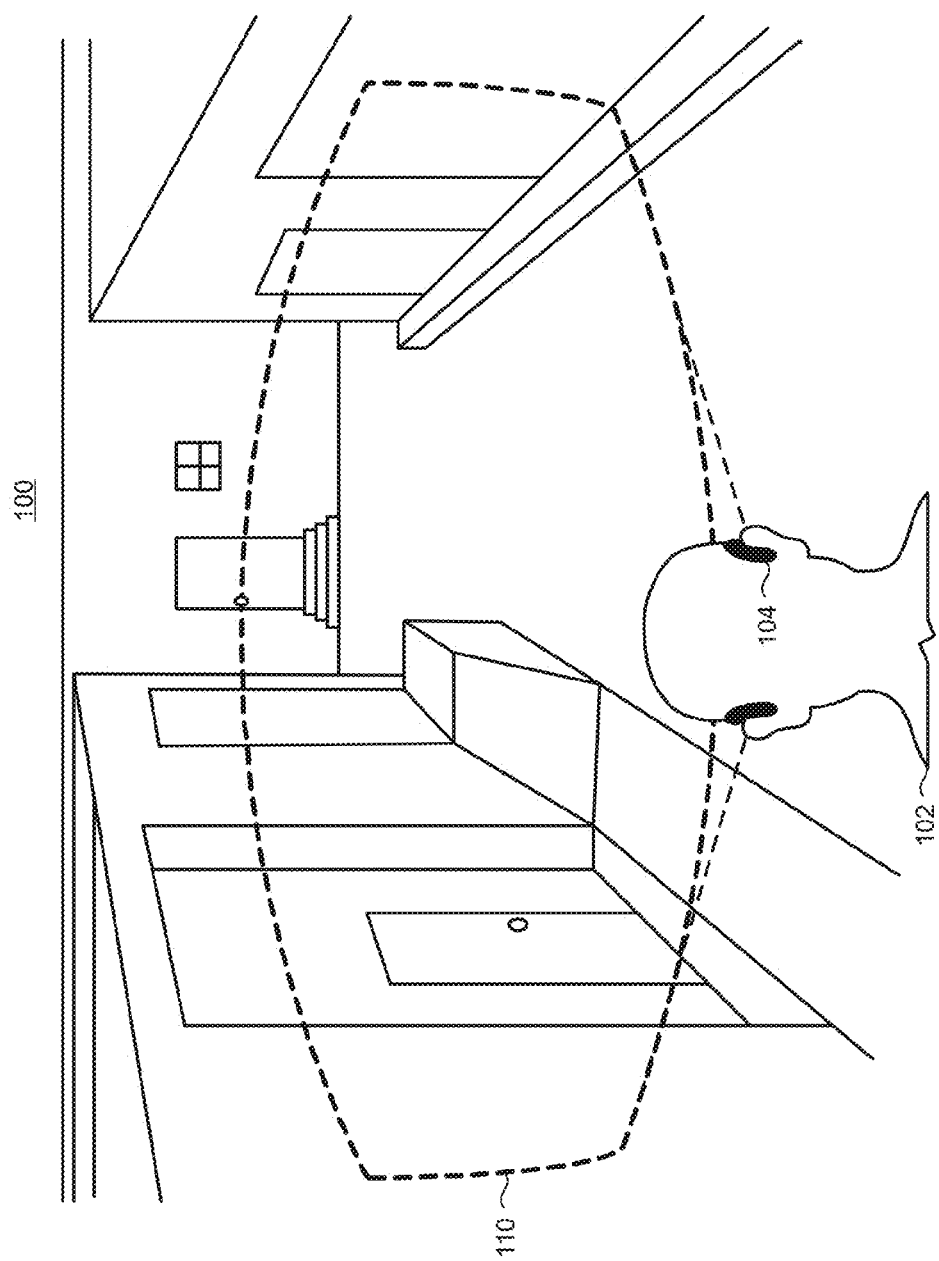
FIGS. 1 and 2 show illustrative virtual reality environments, portions of which are rendered within the view of a user of an HMD device.

Users can typically explore, navigate, and move within a virtual reality environment rendered by an HMD device by moving (e.g., through some form of locomotion) within a corresponding real world, physical space. In an illustrative example, as shown in FIG. 1, a user 102 can employ an HMD device 104 to experience a virtual reality environment 100 that is rendered visually and may include audio and/or tactile/haptic sensations in some implementations. In this particular non-limiting example, the virtual reality environment 100 includes city streets with various buildings, stores, etc., that the user 102 can see and interact with. As the user changes the position or orientation of his head and/or moves within real world space, his view of the virtual reality environment can change. The field of view (represented by the dashed area 110 in FIG. 1) can be sized and shaped and other characteristics of the device can be controlled to make the HMD device experience visually immersive to provide the user with a strong sense of presence in the virtual world.

Figure 2:
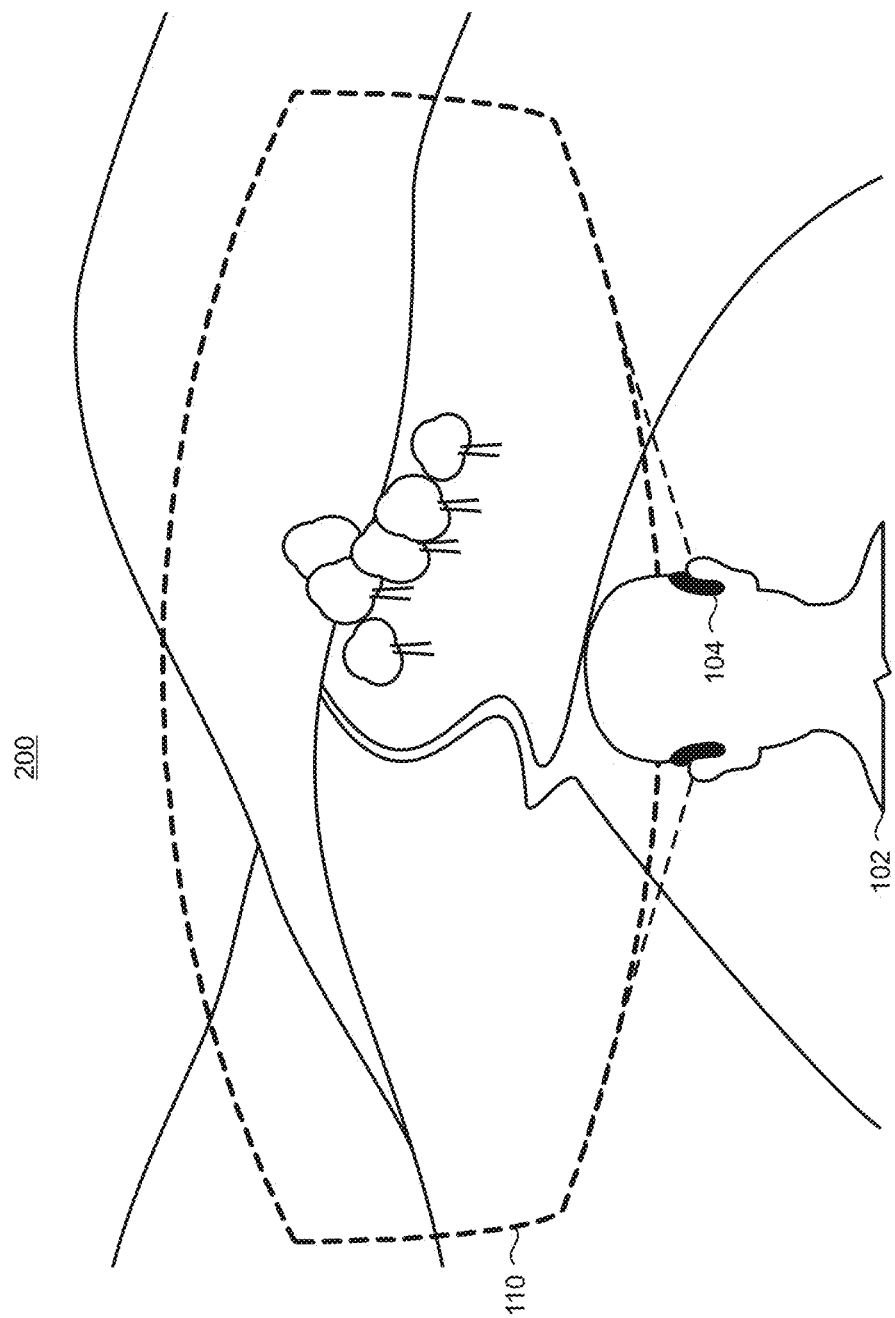

The cityscape of the virtual reality environment 100 can have varying virtual elevations such as streets that go up and down hills, ramps, steps, and curbs, among other features. Another exemplary virtual reality environment 200 shown in FIG. 2 includes a virtual outdoor landscape with rolling, undulating, and hilly terrain having varying virtual elevations.

Figure 3:
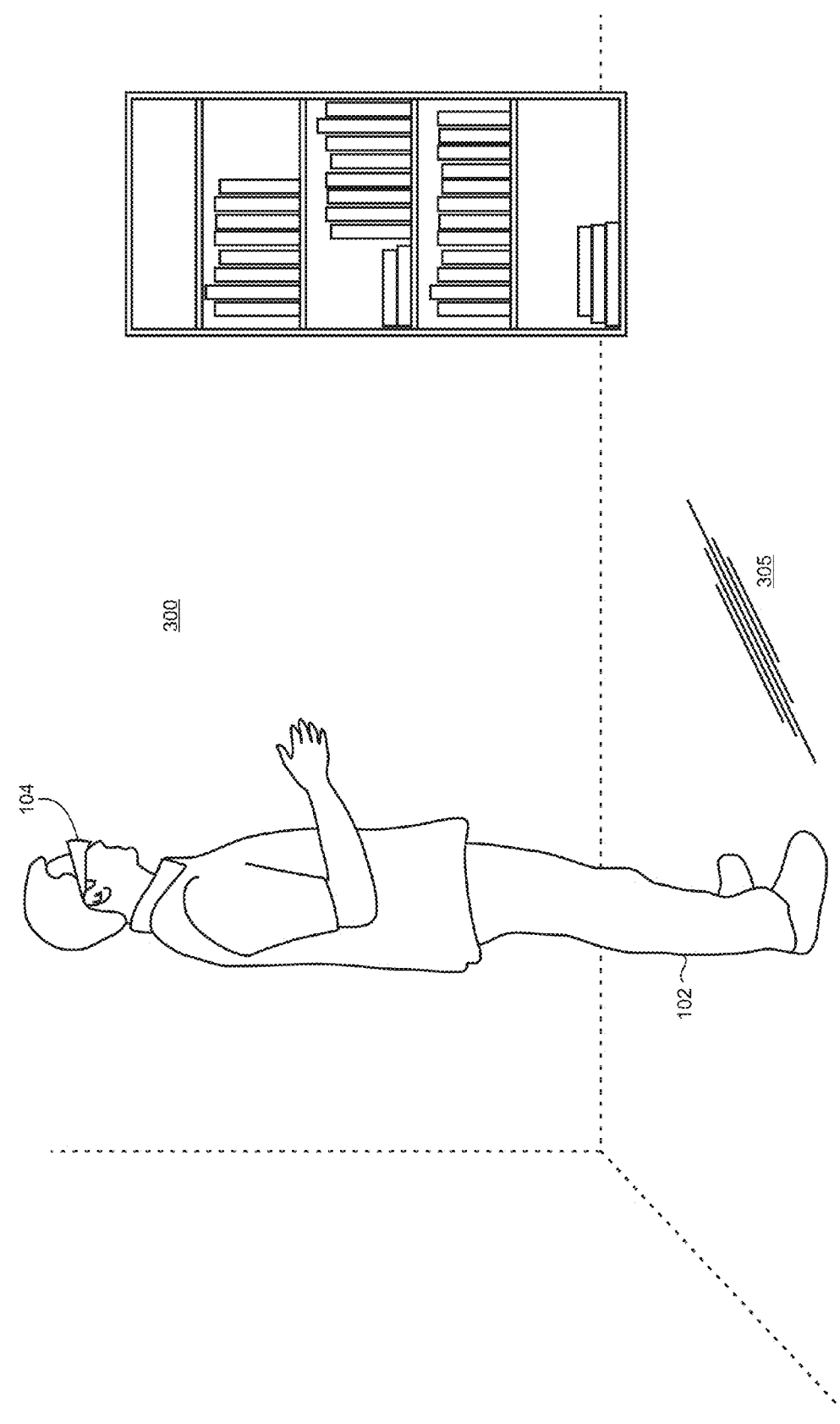
FIG. 3 shows an illustrative real world environment in which a user of an HMD device is located.

As shown in FIG. 3, the user typically occupies a physical, real world space 300 that has a substantially flat floor 305 when using the HMD device 104. Because the physical floor 305 is flat without changes in real world elevation, the user can experience cognitive dissonance due to the mismatch that is created from conflicting sensory signals as the user experiences changing elevations in the virtual reality environment. That is, the user's visual senses through the HMD device 104 can indicate that the user is moving up or down while walking in the virtual environment but the physical sense of interacting with the flat physical floor can conflict and cause user discomfort in some cases.

Figure 4:
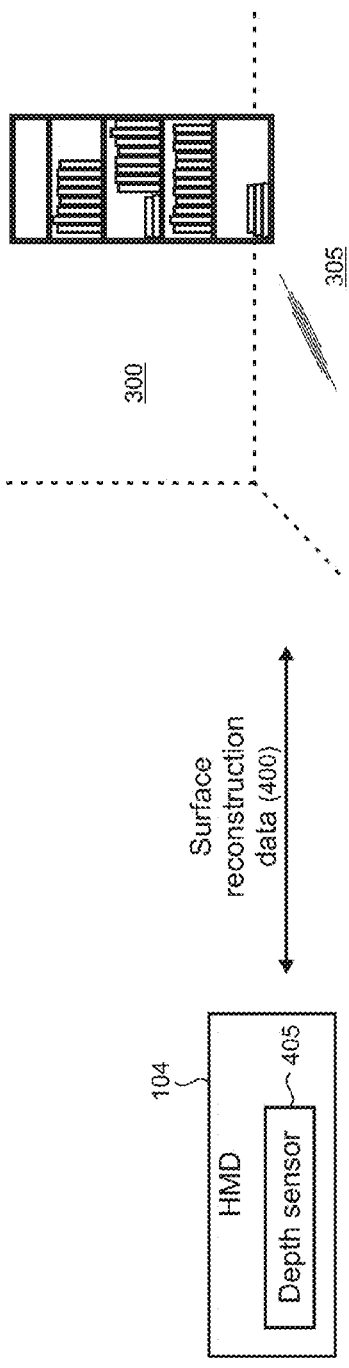
FIG. 4 depicts surface reconstruction data associated with real world objects being captured by an HMD device.

The present HMD device 104 can automatically adjust the ground plane of the virtual environment to match the real world floor when the user is engaged in a virtual reality environment in a way that effectively maintains immersion while minimizing user discomfort due to cognitive dissonance. As shown in FIG. 4, the device is configured to obtain surface reconstruction data 400 by using an integrated depth sensor 405 to sense the user's position within the physical space 300 including the height of the user's head from the real world floor 305. In alternative implementations, depth data can be derived using suitable stereoscopic image analysis techniques.

Figure 5:
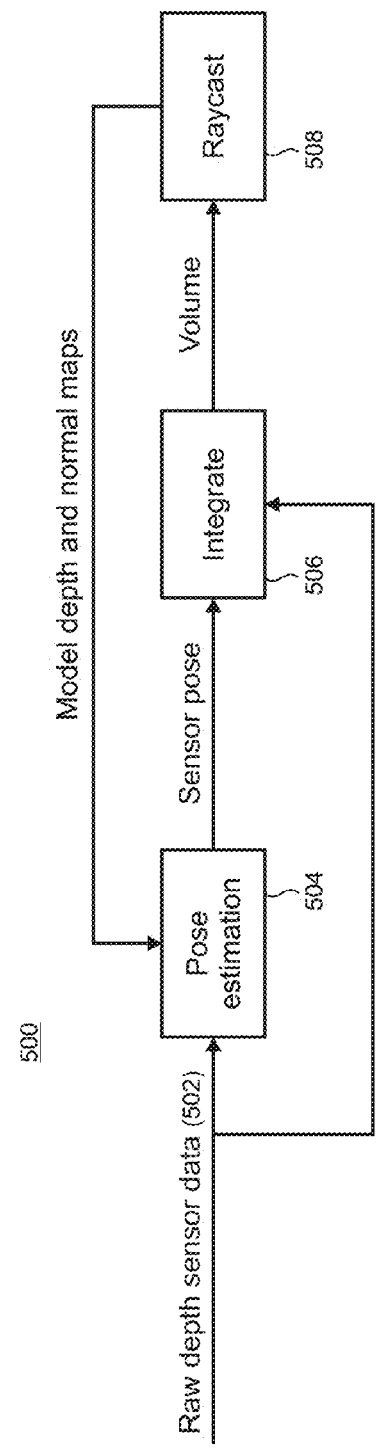
FIG. 5 shows a block diagram of an illustrative surface reconstruction pipeline.

FIG. 5 shows an illustrative surface reconstruction data pipeline 500 for obtaining surface reconstruction data for objects in the real world space. It is emphasized that the disclosed technique is illustrative and that other techniques and methodologies may be utilized depending on the requirements of a particular implementation. Raw depth sensor data 502 is input into a 3D (three-dimensional) pose estimate of the sensor (block 504). Sensor pose tracking can be achieved, for example, using ICP (iterative closest point) alignment between the predicted surface and current sensor measurement. Each depth measurement of the sensor can be integrated (block 506) into a volumetric representation using, for example, surfaces encoded as a signed distance field (SDF). Using a loop, the SDF is raycast (block 508) into the estimated frame to provide a dense surface prediction to which the depth map is aligned. Thus, when the user 102 looks around the virtual world, surface reconstruction data associated with the real world space 300 can be collected and analyzed to determine the user's head position and orientation within the space including its height from the floor.

Figure 6:
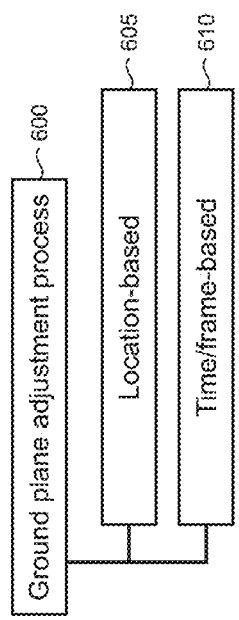
FIG. 6 shows an illustrative ground plane adjustment process that may be alternatively implemented as a location-based process or as a time/frame-based process.

As shown in FIG. 6, the present process 600 to adjust the virtual reality ground plane to match the real world floor can be alternatively performed using a location-based approach 605 or a time/frame-based approach 610. The location-based approach is presented first.

Figure 7:
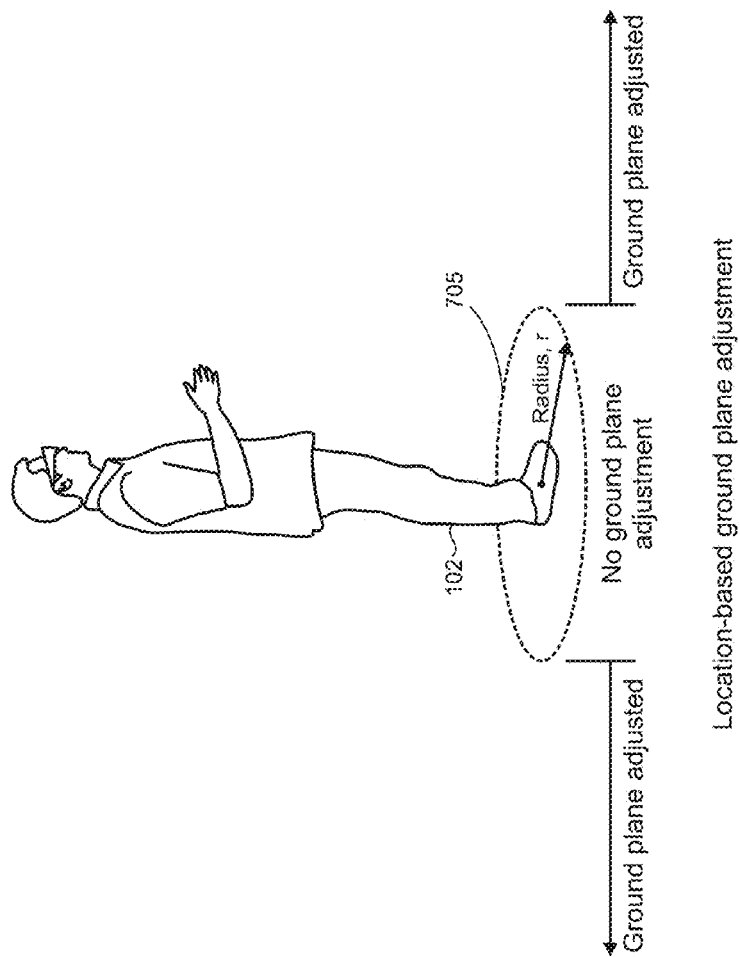
FIG. 7 illustratively depicts a threshold radius that is established around an HMD device user, in which the virtual world ground plane is adjusted to match the real world floor when the user has moved beyond the threshold.

In the location-based approach, as shown in FIG. 7, a threshold radius 705 is established around the user when the user is stationary and not traversing the virtual world. While the user is located within the threshold radius 705, no virtual reality ground plane adjustment is performed. The user can move his head by looking around, bending, squatting, kneeling, or sitting, etc., but as long as the user stays within the radius threshold, no adjustment is performed. When the user's head is determined to be outside the threshold radius 705, which indicates that the user is walking and traversing the virtual world, then the HMD device will render the virtual environment so that the virtual ground and real world floor are matched. Therefore typically, only horizontal translation of the user's head outside the threshold radius and not vertical translation within the threshold is utilized to trigger a ground plane adjustment.

The radius, r can be selected according to particular implementation requirements. Generally, the threshold radius is sized to enable the user to make relatively small movements that are not associated with walking By refraining from adjusting the ground plane in such cases, the user's comfort is maintained since the virtual terrain is not moved when the user is standing in place and not walking. For example, and not as a limitation on the present techniques, the radius can be approximately a half meter to provide a satisfactory balance between user comfort and accurate rendering of a virtual environment in some implementations. Other illustrative non-limiting ranges for the radius may be between approximately one-quarter and three-quarters of a meter.

The virtual reality ground plane adjustment may be performed for discrete chucks of virtual terrain in some implementations. For example as shown in FIG. 8, as the user traverses the virtual and physical worlds, ground plane adjustments to match the real world floor are performed on a non-continuous basis in which separate threshold radii (respectively indicated by reference numerals 802, 804, and 806) are established along the user's traversal path 810. While the path 810 is depicted as a straight line, it is emphasized that paths can follow any arbitrary route and are not necessarily straight. Virtual reality ground plane adjustment is not performed while the user 102 is within each threshold radius, but is performed when the user crosses the threshold into the adjoining threshold radius. Accordingly, in a non-limiting example, the virtual reality ground plane can be aligned to match the real world floor in one meter chucks.

The ground plane adjustment can be optionally subjected to some degree of smoothing as the user transitions between adjoining virtual terrain chucks, as indicated by the triangle elements in FIG. 8 (representatively indicated by reference numeral 812). Additional filtering and/or implementation-specific filtering can also be utilized in some scenarios, such as virtual reality environments that are noisy with respect to elevation changes such as rock-strewn terrain.

Figure 9:
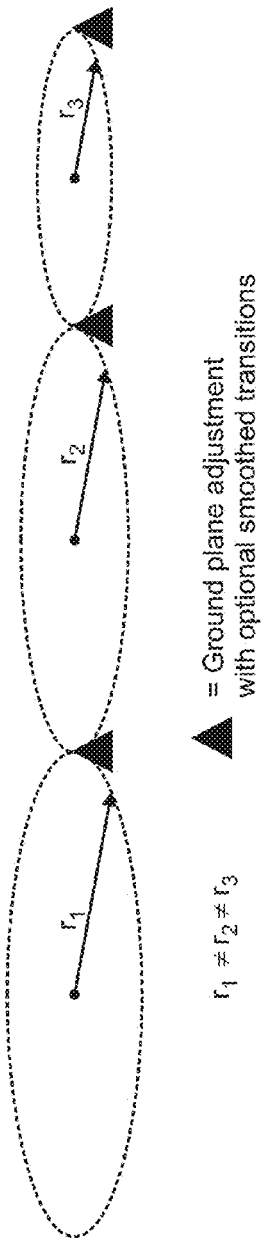
FIG. 9 shows an illustrative ground plane adjustment process in which the threshold radius is variable.

The threshold radii used in a given implementation can be variably sized as shown in FIG. 9. For example, it may be desirable to make a threshold radius smaller when the user is near a portion of a virtual reality environment that has abrupt elevation changes such as a ravine, cliff, etc. in an outdoor terrain, or a ledge, train platform, etc. in a cityscape.

Figure 10:
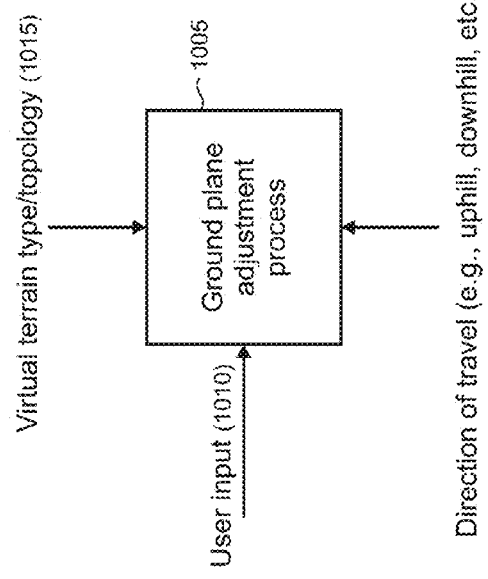
FIG. 10 shows an illustrative ground plane adjustment process that is performed in response to various inputs.

As shown in FIG. 10, the ground plane adjustment process 1005 can be implemented responsively to various inputs. User input 1010 may be used to manually trigger an alignment of the virtual reality ground plane with the real world floor. For example, the HMD device 104 can be configured to expose a user interface that enables such manual triggering and can include manipulation of controls, voice commands or natural language inputs, gestures, or other actions. For example, the user's action of looking at the virtual ground could be utilized to trigger a ground place adjustment with the real world floor. The virtual terrain type or topology 1015 at the user's current location is another exemplary input to the process 1005. As noted above, the presence of abrupt elevation changes may be used to implement differently sized threshold radii. In addition, the user's direction of travel 1020 in the virtual world, such as whether the user is going uphill or downhill in an outdoor environment, or up and down steps in a cityscape, can be utilized as an input to the process. For example, the threshold radii can be sized differently when going uphill as compared to downhill, or ground plane adjustment can be solely implemented, in some cases, when the user is going downhill, but not when going uphill.

Figure 11:
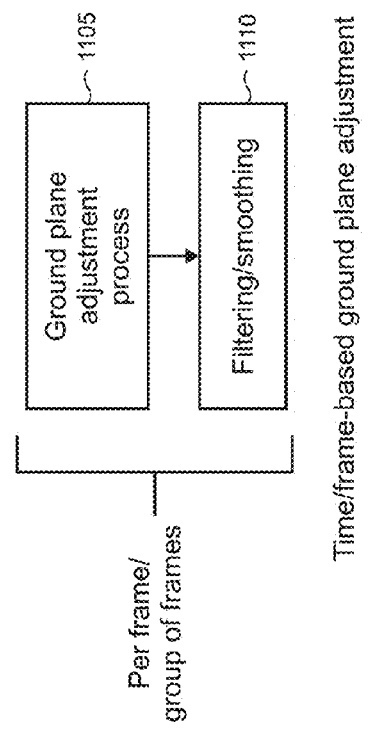
FIG. 11 shows an illustrative time/frame-based ground plane adjustment process.

Turning now to the time/frame-based ground plane adjustment approach discussed above, FIG. 11 shows an illustrative process 1105 that may be performed on a rendering frame-by-frame basis, a group of frames basis, or other time-based metric. Here, the virtual reality ground plane can be continuously adjusted to match the real world floor at each frame or frame group. The ground plane adjustment can be subjected to a smoothing and/or filtering step 1110 to smooth the transitions between adjustments or filter out noise to help reduce user discomfort due to cognitive dissonance.

Figure 14:
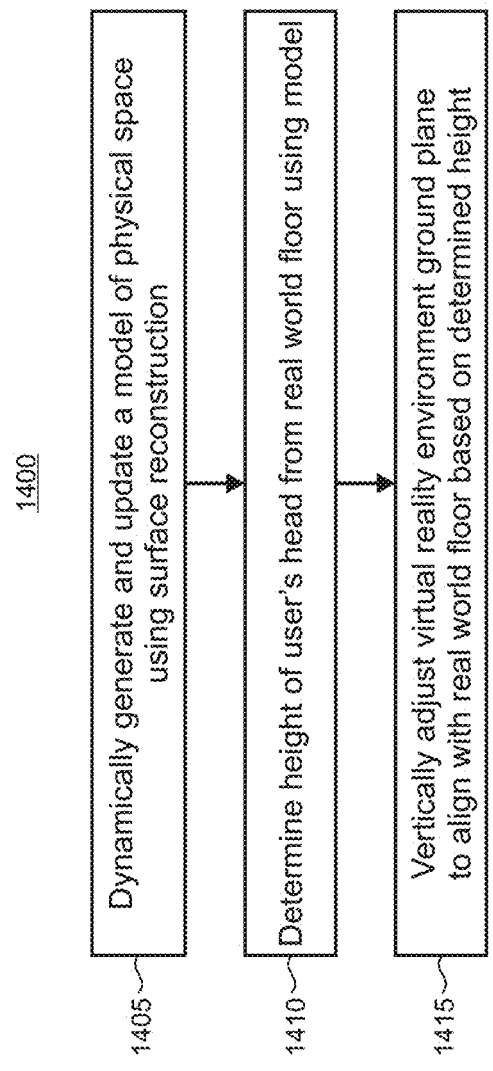

FIGS. 12, 13, and 14 are flowcharts of illustrative methods that may be performed using the HMD device 104. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Method 1200 in FIG. 12 may be performed by an HMD device that supports rendering of a virtual reality environment. In step 1205, sensor data is obtained which describes a physical space that adjoins a user of an HMD device. The sensor data can include, for example, depth data using a depth sensor that is integrated into the HMD device or be obtained from an external sensor or source. Depth-from-stereo imaging analyses may also be used to create depth data. In step 1210, the sensor data is used to reconstruct a geometry of the physical space, for example, using surface reconstruction.

In step 1215, a threshold radius is established around the head location. The ground plane is maintained in its current configuration when the head location is within the threshold radius in step 1220. Typically, the horizontal translation of the head location is utilized when determining if the location is within the threshold radius and vertical translation is not considered. In step 1225, the ground plane is adjusted as needed to match the real world floor when the head location is outside the threshold radius.

The adjustment of the virtual reality ground plane may be performed responsively to user input, virtual terrain type, or travel path in the virtual world in step 1230. For example, the user may manually invoke an adjustment in some implementations, the threshold radius can be variably sized according to the type of terrain being encountered, and adjustments can be dependent on whether the user is going uphill or downhill in the virtual reality environment.

In step 1235, the ground plane can be adjusted for one or more discrete chunks of virtual terrain along the user's path of traversal in the virtual world, and smoothing of transitions and/or filtering can be utilized in step 1240.

Method 1300 in FIG. 13 may be performed by an HMD device having one or more processors, a display for rendering a virtual reality environment, and one or more memory devices that store computer-readable instructions such as software code that can be utilized to implement the method.

In step 1305, surface reconstruction data is generated using a depth sensor or camera system. In step 1310, the surface reconstruction data is used to determine a height of the user's head from the real world floor and to determine when the user has moved beyond a threshold radius that is established around the user in step 1315. Various suitable surface reconstruction techniques may be utilized including that shown in the pipeline in FIG. 5 in which multiple overlapping surfaces are integrated. The HMD device is operated in step 1320 to render the virtual reality environment on the display so that the ground plane is aligned with the real world floor based on the determined height when the user has moved beyond the threshold radius.

Method 1400 in FIG. 14 may be performed by instructions stored on an HMD device operating in a physical space and having a display that renders a virtual reality environment. In step 1405, a model of the physical space is dynamically generated and updated using surface reconstruction. That is, the model can be updated, for example, on a frame-by-frame or other suitable basis, as the user moves within the physical space. The current surface reconstructed model is utilized to determine a height of the user's head from the real world floor in the physical space in step 1410. In step 1415, the head height is used to vertically adjust the ground plane of the virtual reality environment to align with the real world floor. The vertical adjustment can be performed, for example, on a frame-by-frame basis, group of frames basis, or other time-based approach. Alternatively, a location-based approach may be utilized in which a threshold radius is established around the user and no vertical adjustment is performed unless the user moves beyond the threshold radius. Transition smoothing and/or filtering can be utilized in both the time-based and location-based approaches in some implementations.

Figure 15:
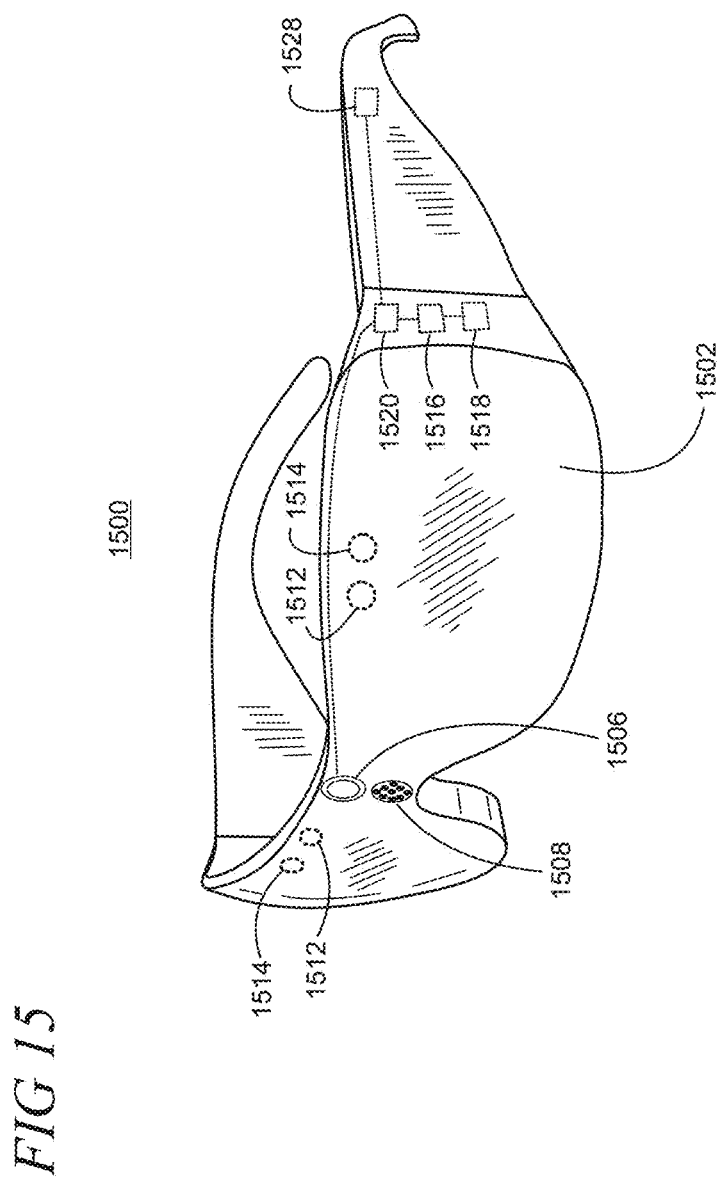
FIG. 15 is a pictorial view of an illustrative example of a virtual reality HMD device.
Figure 16:
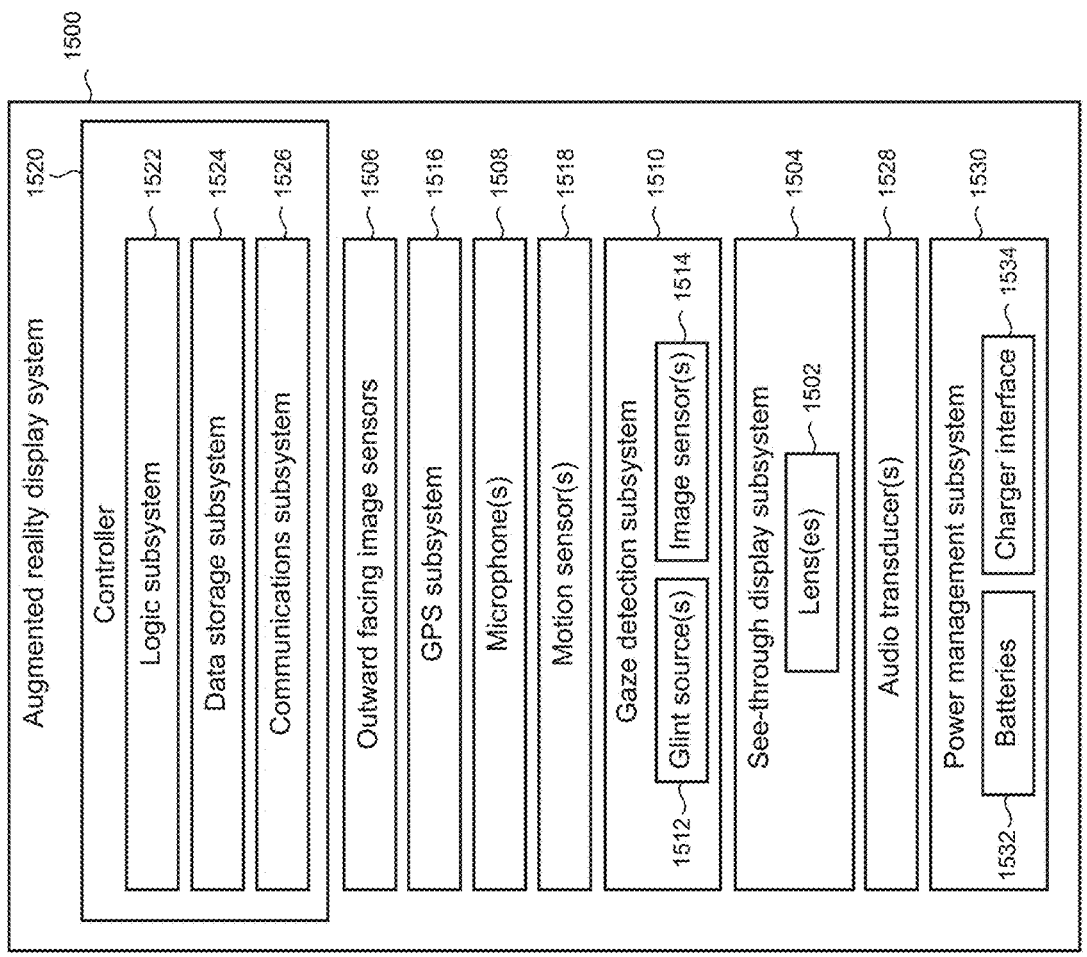
FIG. 16 shows a functional block diagram of an illustrative example of a virtual reality HMD device.
Figure 17:
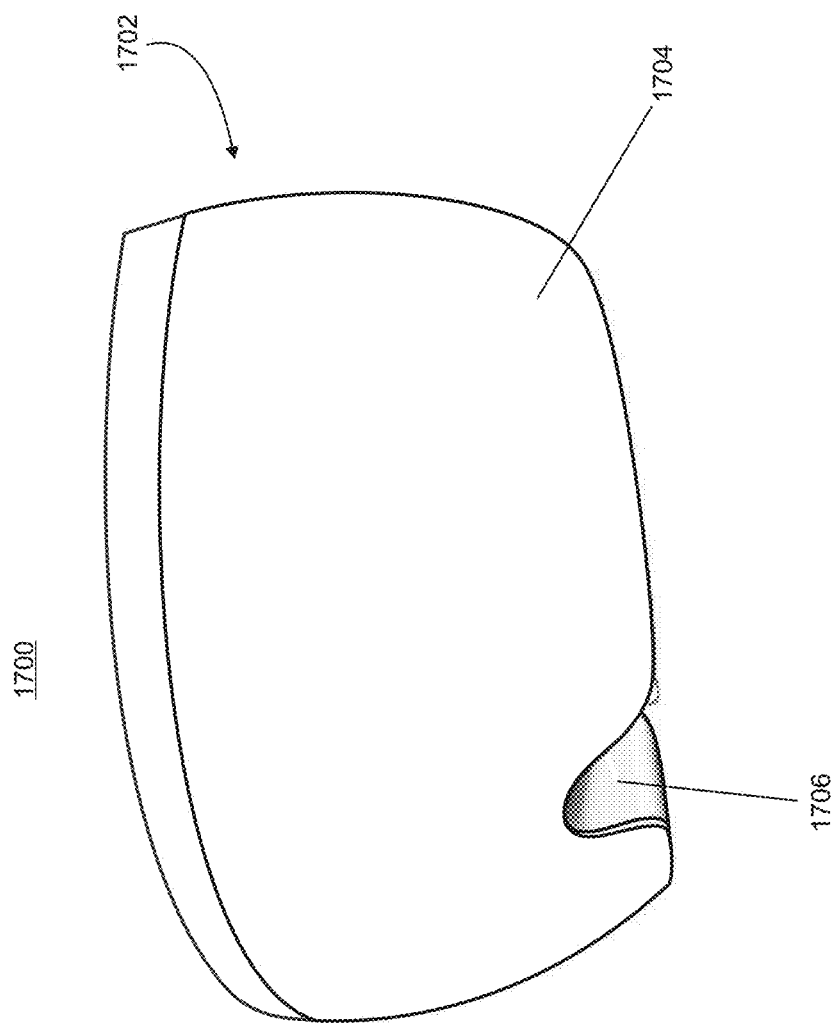
FIGS. 17-18 are pictorial front views of an illustrative sealed visor that may be used as a component of a virtual reality HMD device.
Figure 18:
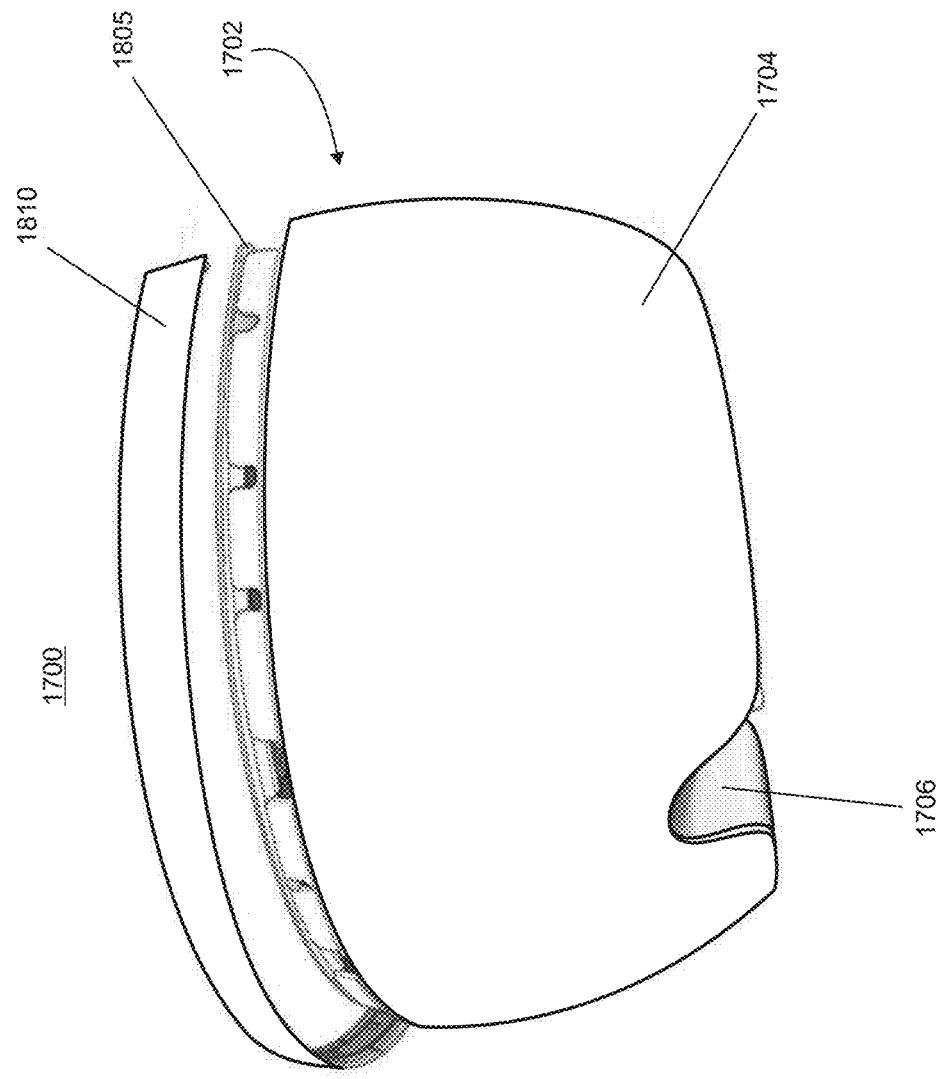

Turning now to various illustrative implementation details, a see-through, mixed reality display device according to the present arrangement may take any suitable form, including but not limited to near-eye devices such as the HMD device 104 and/or other portable/mobile devices. FIG. 15 shows one particular illustrative example of a see-through, mixed reality display system 1500, and FIG. 16 shows a functional block diagram of the system 1500. Display system 1500 comprises one or more lenses 1502 that form a part of a see-through display subsystem 1504, such that images may be displayed using lenses 1502 (e.g. using projection onto lenses 1502, one or more waveguide systems incorporated into the lenses 1502, and/or in any other suitable manner). Display system 1500 further comprises one or more outward-facing image sensors 1506 configured to acquire images of a background scene and/or physical space being viewed by a user, and may include one or more microphones 1508 configured to detect sounds, such as voice commands from a user. Outward-facing image sensors 1506 may include one or more depth sensors and/or one or more two-dimensional image sensors. In alternative arrangements, a mixed reality display system, instead of incorporating a see-through display subsystem, may display mixed reality images through a viewfinder mode for an outward-facing image sensor.

The display system 1500 may further include a gaze detection subsystem 1510 configured for detecting a direction of gaze of each eye of a user or a direction or location of focus, as described above. Gaze detection subsystem 1510 may be configured to determine gaze directions of each of a user's eyes in any suitable manner. For example, in the illustrative example shown, a gaze detection subsystem 1510 includes one or more glint sources 1512, such as infrared light sources, that are configured to cause a glint of light to reflect from each eyeball of a user, and one or more image sensors 1514, such as inward-facing sensors, that are configured to capture an image of each eyeball of the user. Changes in the glints from the user's eyeballs and/or a location of a user's pupil, as determined from image data gathered using the image sensor(s) 1514, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1510 may have any suitable number and arrangement of light sources and image sensors. In some implementations, the gaze detection subsystem 1510 may be omitted.

The display system 1500 may also include additional sensors. For example, display system 1500 may comprise a global positioning system (GPS) subsystem 1516 to allow a location of the display system 1500 to be determined. This may help to identify real world objects, such as buildings, etc. that may be located in the user's adjoining physical environment.

The display system 1500 may further include one or more motion sensors 1518 (e.g., inertial, multi-axis gyroscopic or acceleration sensors) to detect movement and position/orientation/pose of a user's head when the user is wearing the system as part of an augmented reality HMD device. Motion data may be used, potentially along with eye-tracking glint data and outward-facing image data, for gaze detection, as well as for image stabilization to help correct for blur in images from the outward-facing image sensor(s) 1506. The use of motion data may allow changes in gaze location to be tracked even if image data from outward-facing image sensor(s) 1506 cannot be resolved.

In addition, motion sensors 1518, as well as microphone(s) 1508 and gaze detection subsystem 1510, also may be employed as user input devices, such that a user may interact with the display system 1500 via gestures of the eye, neck and/or head, as well as via verbal commands in some cases. It may be understood that sensors illustrated in FIGS. 15 and 16 and described in the accompanying text are included for the purpose of example and are not intended to be limiting in any manner, as any other suitable sensors and/or combination of sensors may be utilized to meet the needs of a particular implementation of an augmented reality HMD device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1500 can further include a controller 1520 having a logic subsystem 1522 and a data storage subsystem 1524 in communication with the sensors, gaze detection subsystem 1510, display subsystem 1504, and/or other components through a communications subsystem 1526. The communications subsystem 1526 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1524 may include instructions stored thereon that are executable by logic subsystem 1522, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1500 is configured with one or more audio transducers 1528 (e.g., speakers, earphones, etc.) so that audio can be utilized as part of an augmented reality experience. A power management subsystem 1530 may include one or more batteries 1532 and/or protection circuit modules (PCMs) and an associated charger interface 1534 and/or remote power interface for supplying power to components in the display system 1500.

It may be appreciated that the depicted display devices 104 and 1500 are described for the purpose of example, and thus are not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

FIGS. 17-21 show an illustrative alternative implementation for an augmented reality display system 1700 that may be used as a component of an HMD device. In this example, the system 1700 uses a see-through sealed visor 1702 that is configured to protect the internal optics assembly utilized for the see-through display subsystem. The visor 1702 is typically interfaced with other components of the HMD device (not shown) such as head mounting/retention systems and other subsystems including sensors, power management, controllers, etc., as illustratively described in conjunction with FIGS. 15 and 16. Suitable interface elements (not shown) including snaps, bosses, screws and other fasteners, etc. may also be incorporated into the visor 1702.

The visor includes see-through front and rear shields 1704 and 1706 respectively that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 1805 as depicted in the partially exploded view in FIG. 18 in which a shield cover 1810 is shown as disassembled from the visor 1702.

The sealed visor 1702 can physically protect sensitive internal components, including an optics display subassembly 1902 (shown in the disassembled view in FIG. 19) when the HMD device is worn and used in operation and during normal handling for cleaning and the like. The visor 1702 can also protect the optics display subassembly 1902 from environmental elements and damage should the HMD device be dropped or bumped, impacted, etc. The optics display subassembly 1902 is mounted within the sealed visor in such a way that the shields do not contact the subassembly when deflected upon drop or impact.

Figure 19:
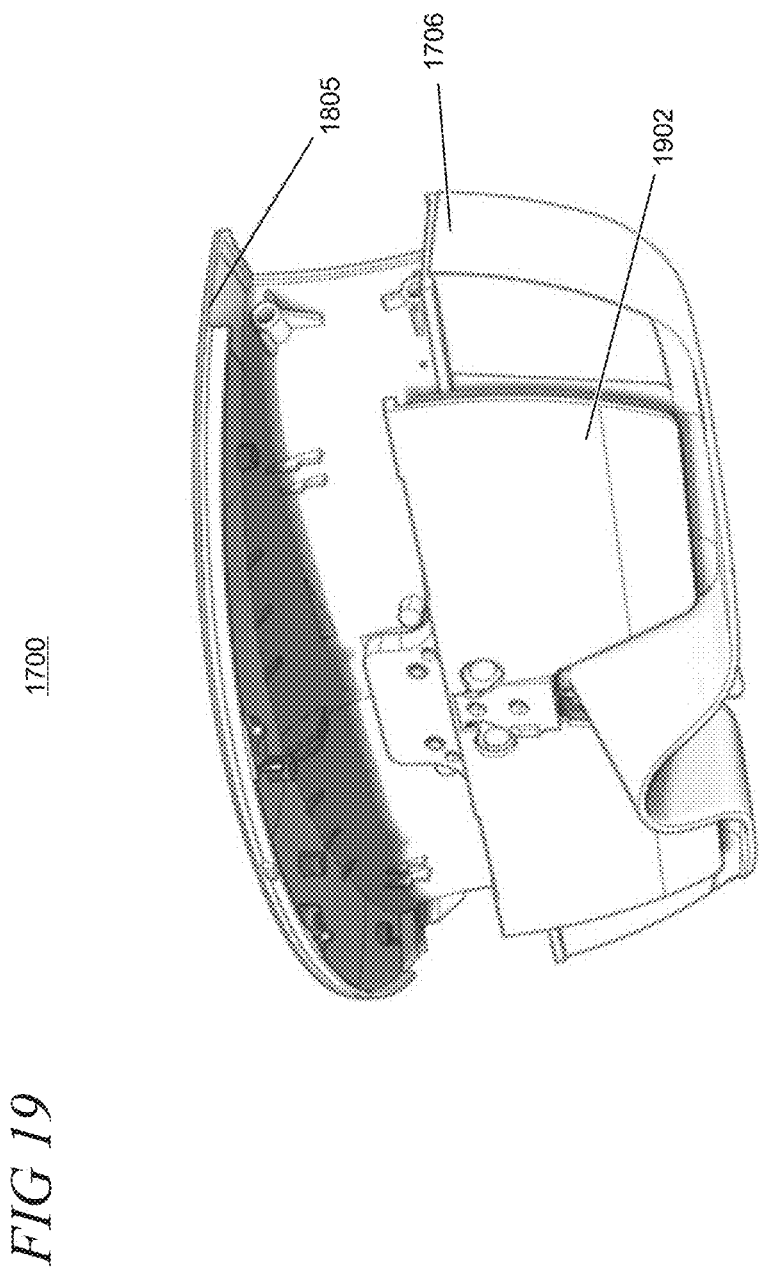
FIG. 19 shows a view of the sealed visor when partially disassembled.
Figure 20:
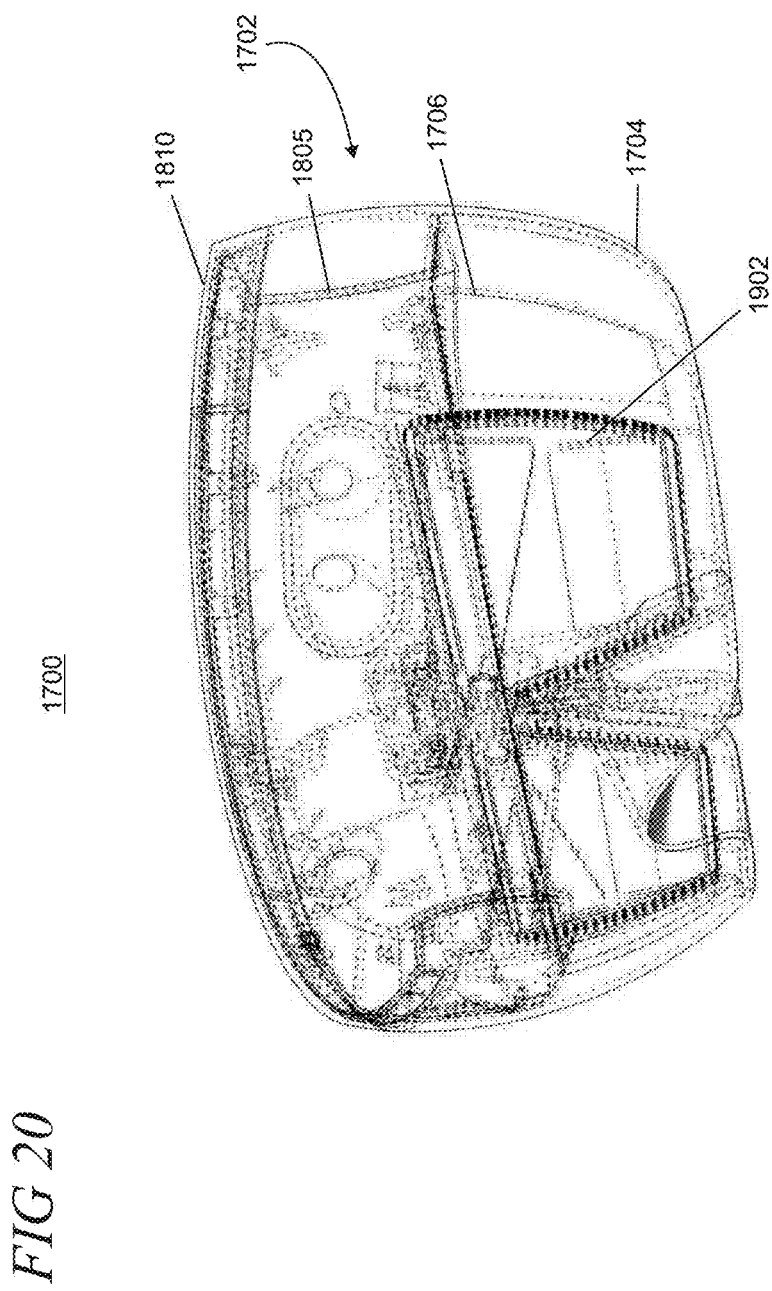
FIG. 20 shows a phantom line front view of the sealed visor.
Figure 21:
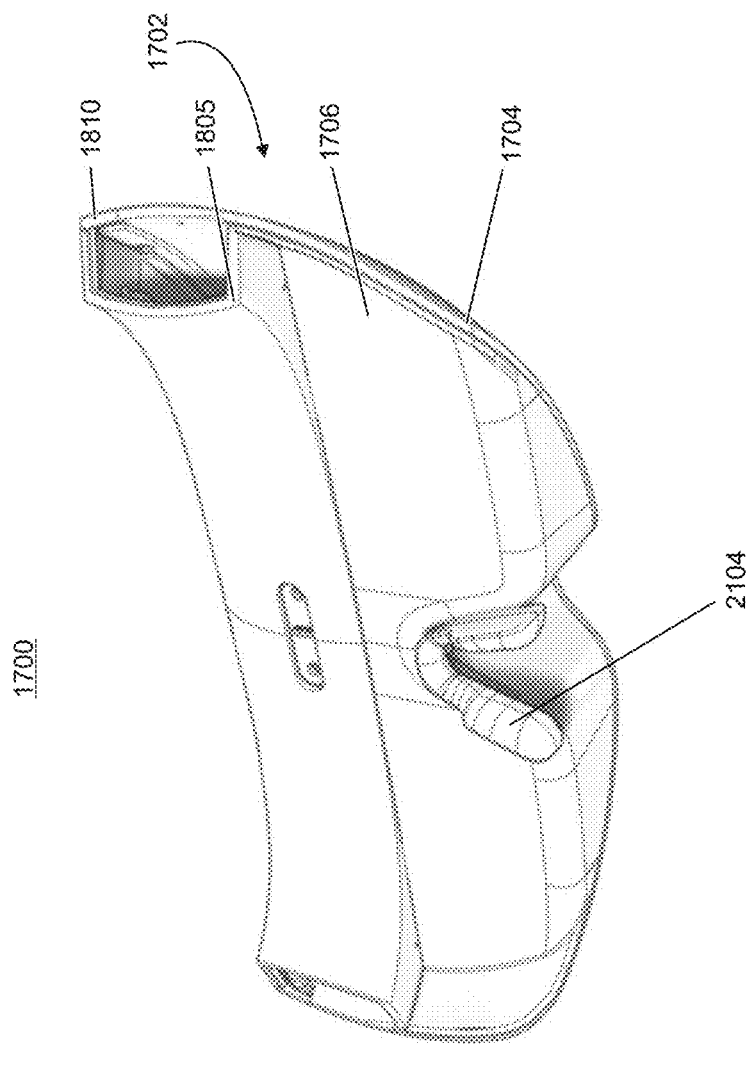
FIG. 21 shows a pictorial back of the sealed visor.

As shown in FIGS. 19 and 21, the rear shield 1706 is configured in an ergonomically correct form to interface with the user's nose and nose pads 2104 (FIG. 21) and other comfort features can be included (e.g., molded-in and/or added-on as discrete components). The sealed visor 1702 can also incorporate some level of optical diopter curvature (i.e., eye prescription) within the molded shields in some cases.

Figure 22:
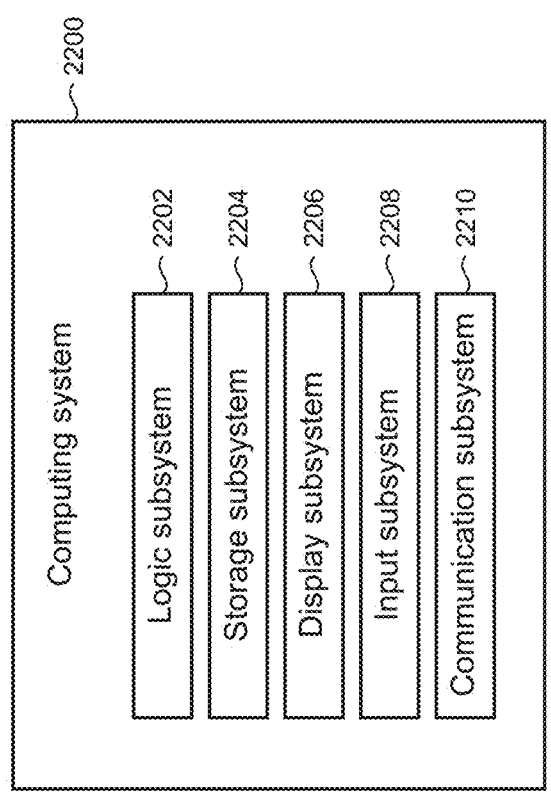
FIG. 22 shows an exemplary computing system.

FIG. 22 schematically shows a non-limiting embodiment of a computing system 2200 that can be used when implementing one or more of the configurations, arrangements, methods, or processes described above. The HMD device 104 may be one non-limiting example of computing system 2200. The computing system 2200 is shown in simplified form. It may be understood that virtually any computer architecture may be used without departing from the scope of the present arrangement. In different embodiments, computing system 2200 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

The computing system 2200 includes a logic subsystem 2202 and a storage subsystem 2204. The computing system 2200 may optionally include a display subsystem 2206, an input subsystem 2208, a communication subsystem 2210, and/or other components not shown in FIG. 22.

The logic subsystem 2202 includes one or more physical devices configured to execute instructions. For example, the logic subsystem 2202 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 2202 may include one or more processors configured to execute software instructions. Additionally or alternatively, the logic subsystem 2202 may include one or more hardware or firmware logic machines configured to execute hardware or firmware instructions. The processors of the logic subsystem 2202 may be single-core or multi-core, and the programs executed thereon may be configured for sequential, parallel, or distributed processing. The logic subsystem 2202 may optionally include individual components that are distributed among two or more devices, which can be remotely located and/or configured for coordinated processing. Aspects of the logic subsystem 2202 may be virtualized and executed by remotely accessible, networked computing devices configured in a cloud-computing configuration.

The storage subsystem 2204 includes one or more physical devices configured to hold data and/or instructions executable by the logic subsystem 2202 to implement the methods and processes described herein. When such methods and processes are implemented, the state of the storage subsystem 2204 may be transformed—for example, to hold different data.

The storage subsystem 2204 may include removable media and/or built-in devices. The storage subsystem 2204 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 2204 may include volatile, nonvolatile, dynamic, static, read/write, read-only, random-access, sequential-access, location-addressable, file-addressable, and/or content-addressable devices.

It may be appreciated that the storage subsystem 2204 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 2202 and of the storage subsystem 2204 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, the display subsystem 2206 may be used to present a visual representation of data held by storage subsystem 2204. This visual representation may take the form of a graphical user interface (GUI). As the present described methods and processes change the data held by the storage subsystem, and thus transform the state of the storage subsystem, the state of the display subsystem 2206 may likewise be transformed to visually represent changes in the underlying data. The display subsystem 2206 may include one or more display devices utilizing virtually any type of technology. Such display devices may be combined with logic subsystem 2202 and/or storage subsystem 2204 in a shared enclosure in some cases, or such display devices may be peripheral display devices in others.

When included, the input subsystem 2208 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on- or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 2210 may be configured to communicatively couple the computing system 2200 with one or more other computing devices. The communication subsystem 2210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2200 to send and/or receive messages to and/or from other devices using a network such as the Internet.

Various exemplary embodiments of the present ground plane adjustment in a virtual reality environment are now presented by way of illustration and not as an exhaustive list of all embodiments. An example includes a method performed by a head mounted display (HMD) device supporting rendering of a virtual reality environment, comprising: obtaining sensor data describing a physical space adjoining a user of the HMD device; using the sensor data, reconstructing a geometry of the physical space including a real world floor; using the reconstructed geometry, determining a location of the user's head in the physical space including a height of the user's head from the real world floor; establishing a threshold radius around the location; maintaining a ground plane for the virtual reality environment when the location is within the threshold radius; and adjusting the ground plane as needed to match the real world floor when the location is outside the threshold radius.

In another example, the sensor data includes depth data and the method further includes generating the sensor data using a depth sensor and applying surface reconstruction techniques to reconstruct the physical space geometry. In another example, the method further includes generating depth data using one or more depth-from-stereo imaging analyses. In another example, the method further includes varying the threshold radius according to terrain type in the virtual reality environment. In another example, the method further includes configuring the HMD device to expose a user interface (UI) to the user and performing the adjusting responsively to user input to the UI. In another example, the method further includes performing the adjusting depending on a traversal path of the user in the virtual reality environment, the path being one of a path having increasing virtual elevation or a path having decreasing virtual elevation. In another example, the method further includes performing the adjusting for each of one or more discrete chunks of the virtual reality environment along a traversal path. In another example, the method further includes applying smoothing or filtering when adjusting ground plane. In another example, the method further includes determining the height using surface reconstruction data obtained when the user looks down at the virtual reality environment ground plane. In another example, the threshold radius has a value between one-quarter and three-quarters of a meter.

A further example includes a head mounted display (HMD) device operable by a user in a physical environment having a real world floor, comprising: one or more processors; a display for rendering a virtual reality environment to the user; and one or more memory devices storing computer-readable instructions which, when executed by the one or more processors, perform a method comprising the steps of: generating surface reconstruction data using a depth sensor or camera system, using the surface reconstruction data, determining a height of the user's head from the real world floor, using the surface reconstruction data, detecting when the user has moved beyond a threshold radius that is established around the user, operating the HMD device to render the virtual reality environment on the display so that the ground plane is aligned with the real world floor based on the determined height when the user has moved beyond the threshold radius.

In another example, the HMD device further includes using the surface reconstruction data to determine whether the user is traversing the virtual reality environment and establishing the threshold radius when the user is not traversing the virtual reality environment. In another example, the HMD device further includes performing the operating responsively to user input, virtual terrain type, and direction of traversal in the virtual reality environment. In another example, the HMD device further includes varying the threshold radius when the user is proximate to a portion of the virtual reality environment that includes abrupt changes in elevation. In another example, the HMD device further includes modeling the physical environment using a surface reconstruction data pipeline that implements a volumetric method creating multiple overlapping surfaces that are integrated. In another example, the HMD device further includes a sealed protective visor that substantially encases the display.

A further example includes one or more computer readable memories storing computer-executable instructions for rendering a virtual reality environment having variable virtual elevations on a head mounted display (HMD) device located in a physical space having a floor, the method comprising the steps of: using surface reconstruction to dynamically generate and update a model of the physical space as the user traverses the virtual reality environment; determining a height of the user's head from the floor of the physical space using the model; and using the determined height, vertically adjusting a ground plane of the virtual reality environment to align with the floor of the physical space.

In another example, the one or more computer readable memories further include performing the vertical adjustment on a frame-by-frame basis or a group of frames basis. In another example, the one or more computer readable memories further include filtering or smoothing the vertical adjustment. In another example, the one or more computer readable memories further include using the model to determine a location of the user's head in the physical space, establishing a threshold radius around a location, maintaining a current alignment of the ground plane when the location is within the threshold radius, and performing the vertical adjustment of the ground plane when the location is beyond the threshold radius.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a head mounted display (HMD) device supporting rendering of a virtual reality environment, comprising:
   generating sensor data describing a physical space adjoining a user of the HMD device;
   using the sensor data, reconstructing a geometry of the physical space including a real world floor;
   using the reconstructed geometry, determining a location of the user's head in the physical space including a height of the user's head from the real world floor;
   establishing a threshold radius around the location;
   maintaining a ground plane for the virtual reality environment when the location is within the threshold radius; and
   adjusting the ground plane to match the real world floor when the location is outside the threshold radius.

2. The method of claim 1 in which the sensor data includes depth data and further including generating the sensor data using a depth sensor and applying surface reconstruction techniques to reconstruct the physical space geometry.

3. The method of claim 1 further including generating depth data using one or more depth-from-stereo imaging analyses.

4. The method of claim 1 further including varying the threshold radius according to terrain type in the virtual reality environment.

5. The method of claim 1 further including configuring the HMD device to expose a user interface (UI) to the user and performing the adjusting responsively to user input to the UI.

6. The method of claim 1 further including performing the adjusting depending on a traversal path of the user in the virtual reality environment, the path being one of a path having increasing virtual elevation or a path having decreasing virtual elevation.

7. The method of claim 6 further including performing the adjusting for each of one or more discrete chunks of the virtual reality environment along a traversal path.

8. The method of claim 1 further including applying smoothing or filtering when adjusting ground plane.

9. The method of claim 1 further including determining the height using surface reconstruction data obtained when the user looks down at the virtual reality environment ground plane.

10. The method of claim 1 in which the threshold radius has a value between one-quarter and three-quarters of a meter.

11. A head mounted display (HMD) device operable by a user in a physical environment having a real world floor, comprising:
one or more processors;
a display for rendering a virtual reality environment to the user; and
one or more memory devices storing computer-readable instructions which, when executed by the one or more processors, perform a method comprising the steps of:
generating surface reconstruction data using a depth sensor or camera system,
using the surface reconstruction data, determining a height of the user's head from the real world floor,
using the surface reconstruction data, detecting when the user has moved beyond a threshold radius that is established around the user,
operating the HMD device to render the virtual reality environment on the display so that the ground plane is aligned with the real world floor based on the determined height when the user has moved beyond the threshold radius.

12. The HMD device of claim 11 further including using the surface reconstruction data to determine whether the user is traversing the virtual reality environment and establishing the threshold radius when the user is not traversing the virtual reality environment.

13. The HMD device of claim 12 further including performing the operating responsively to user input, virtual terrain type, and direction of traversal in the virtual reality environment.

14. The HMD device of claim 11 further including varying the threshold radius when the user is proximate to a portion of the virtual reality environment that includes abrupt changes in elevation.

15. The HMD device of claim 11 further including modeling the physical environment using a surface reconstruction data pipeline that implements a volumetric method creating multiple overlapping surfaces that are integrated.

16. The HMD device of claim 11 further including a sealed protective visor that substantially encases the display.

17. One or more hardware-based computer-readable memory devices not consisting of propagated signals storing computer-executable instructions for rendering a virtual reality environment having variable virtual elevations on a head mounted display (HMD) device located in a physical space having a floor, the method comprising the steps of:
using a depth sensor to generate surface reconstruction data to dynamically generate and update a model of the physical space as a user traverses the virtual reality environment;
determining a height of the user's head from the floor of the physical space using the model; and
using the determined height, vertically adjusting a ground plane of the virtual reality environment to align with the floor of the physical space.

18. The one or more hardware-based computer-readable memory devices of claim 17 further including performing the vertical adjustment on a frame-by-frame basis or a group of frames basis.

19. The one or more hardware-based computer-readable memory devices of claim 18 further including filtering or smoothing the vertical adjustment.

20. The one or more hardware-based computer-readable memory devices of claim 19 further including using the model to determine a location of the user's head in the physical space, establishing a threshold radius around a location, maintaining a current alignment of the ground plane when the location is within the threshold radius, and performing the vertical adjustment of the ground plane when the location is beyond the threshold radius.

* * * * *